United States Patent
Wilhelm et al.

(10) Patent No.: US 7,006,911 B2
(45) Date of Patent: Feb. 28, 2006

(54) ACTUATOR CONTROL SYSTEM

(75) Inventors: Daniel D. Wilhelm, Nashville, IN (US); Gregory R. White, Columbus, IN (US); Charles Wu, Indianapolis, IN (US)

(73) Assignee: Cummins, Inc., Columbus, IN (US)

( * ) Notice: Subject to any disclaimer, the term of this patent is extended or adjusted under 35 U.S.C. 154(b) by 104 days.

(21) Appl. No.: 10/701,197

(22) Filed: Nov. 4, 2003

(65) Prior Publication Data

US 2005/0092949 A1     May 5, 2005

(51) Int. Cl.
    *G05D 1/00*     (2006.01)
(52) U.S. Cl. ............ 701/108; 123/568.12; 123/568.24; 361/93.9
(58) Field of Classification Search ................ 701/108; 123/568.12, 568.24; 361/93.9
See application file for complete search history.

(56) References Cited

U.S. PATENT DOCUMENTS

| | | | | |
|---|---|---|---|---|
| 3,809,960 A | 5/1974 | Jossic | ......................... | 327/138 |
| 4,216,421 A | 8/1980 | Dupont | ....................... | 318/471 |
| 4,743,818 A | 5/1988 | Quayle et al. | .............. | 318/473 |
| 4,945,508 A | 7/1990 | Benejean | .................... | 364/802 |
| 4,969,104 A | 11/1990 | Suzuki et al. | ......... | 364/431.06 |
| 5,189,350 A | 2/1993 | Mallett | ........................ | 318/434 |
| 5,394,954 A * | 3/1995 | Tashiro et al. | .............. | 180/178 |
| 5,460,146 A | 10/1995 | Frankenberg | ............... | 123/571 |
| 5,539,601 A | 7/1996 | Farag | .......................... | 361/23 |
| 5,576,632 A | 11/1996 | Petsche et al. | ............... | 324/772 |
| 5,619,435 A | 4/1997 | Prakash et al. | ............. | 364/578 |
| 5,629,621 A | 5/1997 | Goldfine et al. | ............ | 324/239 |
| 6,019,094 A | 2/2000 | Itoyama | ....................... | 123/676 |
| 6,035,265 A | 3/2000 | Dister et al. | ................. | 702/183 |
| 6,098,602 A | 8/2000 | Martin et al. | .......... | 123/568.23 |
| 6,182,644 B1 | 2/2001 | Kotwicki et al. | ....... | 123/568.16 |
| 6,209,530 B1 * | 4/2001 | Faletti et al. | .......... | 123/568.21 |
| 6,227,182 B1 | 5/2001 | Muraki et al. | ......... | 123/568.21 |
| 6,293,267 B1 | 9/2001 | Smith et al. | ........... | 123/568.22 |
| 6,298,835 B1 | 10/2001 | Horie et al. | ........... | 123/568.21 |
| 6,321,732 B1 | 11/2001 | Kotwicki et al. | ....... | 123/568.16 |
| 6,324,494 B1 | 11/2001 | Saban | ........................ | 703/13 |
| 6,374,814 B1 | 4/2002 | Cook et al. | ............. | 123/568.21 |
| 6,382,194 B1 | 5/2002 | Maeda | .................... | 123/568.16 |
| 6,393,373 B1 | 5/2002 | Duyar et al. | ................. | 702/115 |
| 6,401,700 B1 | 6/2002 | Balekai et al. | ......... | 123/568.12 |
| 6,411,052 B1 | 6/2002 | Mir et al. | .................... | 318/434 |
| 6,435,169 B1 | 8/2002 | Vogt | ....................... | 123/568.23 |
| 6,467,469 B1 | 10/2002 | Yang et al. | ............. | 123/568.21 |
| 6,609,493 B1 * | 8/2003 | Yamaguchi et al. | ......... | 123/299 |

* cited by examiner

*Primary Examiner*—Tony M. Argenbright
*Assistant Examiner*—Johnny H. Hoang
(74) *Attorney, Agent, or Firm*—Barnes & Thornburg LLP (57) ABSTRACT

A system is disclosed for controlling the current used by an actuator to control actuator position. A control circuit is configured to control the actuator current to a value at or near the minimum current required to sustain the actuator in a desired position in order to maintain the actuator operating temperature below a specified maximum actuator temperature.

20 Claims, 7 Drawing Sheets

ACTUATOR CONTROL SYSTEM

FIELD OF THE DISCLOSURE

This disclosure relates generally to systems for managing the operation of an actuator, and more specifically to systems for controlling actuator current to sustain a desired actuator position.

BACKGROUND OF THE DISCLOSURE

Many actuator position control applications require not only moving the actuator to a desired position, but also sustaining the actuator in the desired position for a period of time. Examples of such applications include, but are not limited to, exhaust gas recirculation (hereinafter sometimes EGR) valve control applications, variable geometry turbocharger (hereinafter sometimes VGT) mechanism control applications, exhaust gas wastegate valve control applications, exhaust gas throttle control applications, and the like. In such systems, a control system is typically implemented to control the position of the actuator.

In controlling an actuator to sustain a desired actuator position, the actuator current required to sustain the desired actuator position is generally understood to be proportional to the force applied to the actuator plus or minus the friction of the actuator positioning system. It is desirable under such conditions to control the actuator current to a value at or near the minimum current required to sustain the actuator in the desired position in order to maintain the actuator operating temperature below a specified maximum operating temperature.

SUMMARY OF THE DISCLOSURE

The present invention may comprise one or more of the following features or combinations thereof. An actuator control system may comprise an actuator responsive to an actuator control signal to control actuator position, means for determining actuator current used by the actuator, and a control circuit. The control circuit may be responsive to the actuator current exceeding a maximum actuator current value to modify the actuator control signal in a manner that limits the actuator current to a current value near a minimum current required to sustain the actuator position near a desired position.

The control circuit may include friction avoidance logic configured to produce an offset value, wherein the offset value is a function of the actuator control signal if the actuator current exceeds the maximum actuator current value and otherwise being a constant offset value, and a controller responsive to a difference between an actuator position error value and the offset value to modify the actuator control signal such that the actuator current is limited to a current value near a minimum current required to sustain the actuator position near the desired actuator position by minimizing a difference between the actuator position error value and the offset value. The friction avoidance logic may be configured to produce the offset value as an offset gain value if a delayed value of the actuator control signal is greater than zero and to otherwise produce the offset value as a negative of the offset gain value, if the actuator current exceeds the maximum actuator current value.

The system may further include an actuator position sensor producing a position signal indicative of the actuator position relative to a reference position, and actuator position error logic configured to produce the actuator position error value as a difference between a desired position of the actuator and the position signal.

The controller may include proportional logic producing a proportional value that is proportional to the actuator position error value, derivative logic producing a derivative value that is a derivative of the actuator position error value, and integral logic producing an integral value that is an integral of the difference between the actuator position error value and the offset value. The integral logic may include an integrator operable to minimize the difference between the actuator position error value and the offset value. Summation logic may produce the actuator control signal as a sum of the proportional value, the derivative value and the integral value, wherein the actuator control signal results in the actuator current being limited to the current value near the minimum current required to sustain the actuator position near the desired actuator position when the integrator minimizes the difference between the actuator position error value and the offset value.

The means for determining actuator current may comprise actuator current estimation logic configured to estimate the actuator current as a function of the actuator control signal, a supply voltage value, an actuator direction value indicative of actuator movement direction, the position signal and an actuator temperature value indicative of actuator operating temperature. An engine cooling system may be coupled to the actuator such that the actuator operating temperature is near that of coolant fluid circulating through the engine cooling system, and the means for determining actuator current may further comprise actuator temperature estimation logic configured to estimate the actuator temperature value as a function of the actuator current and a temperature signal indicative of coolant fluid temperature. Alternatively, the means for determining actuator current may comprise a current sensor or probe configured to produce a signal indicative of the actuator current, or configured to produce a signal from which the actuator current may be determined or derived.

The actuator may include an electric motor coupled to a valve such that the electric motor controls a position of the valve relative to a reference valve position. The valve may be disposed in-line with an exhaust gas recirculation conduit coupled between an intake manifold and an exhaust manifold of an internal combustion engine, and the control circuit may be configured to adjust the position of the valve to control the flow of recirculated exhaust gas from the exhaust manifold to the intake manifold.

A method of controlling an actuator configured to control actuator position may comprise determining actuator current used by the actuator, and controlling the actuator current toward a minimum value of current required to sustain the actuator position near a desired actuator position. The actuator may be responsive to an actuator control signal to control the actuator position, and the act of controlling the actuator current may include determining an error value as a difference between a desired actuator position and an actual actuator position, determining an offset value as a function of the actuator control signal if the actuator current exceeds a maximum actuator current value, and modifying the actuator control signal to limit the actuator current to a current value near a minimum current required to sustain the actuator position near the desired actuator position by minimizing a difference between the error value and the offset value. The act of determining actuator current may include estimating the actuator current as a function of the actuator control signal, a supply voltage value, an actuator direction value indicative of actuator movement direction, the actual actuator position and an actuator temperature value indicative of actuator operating temperature.

These and other objects of the present invention will become more apparent from the following description of the illustrative embodiments.

DESCRIPTION OF THE ILLUSTRATIVE EMBODIMENTS

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended.

Figure 1:
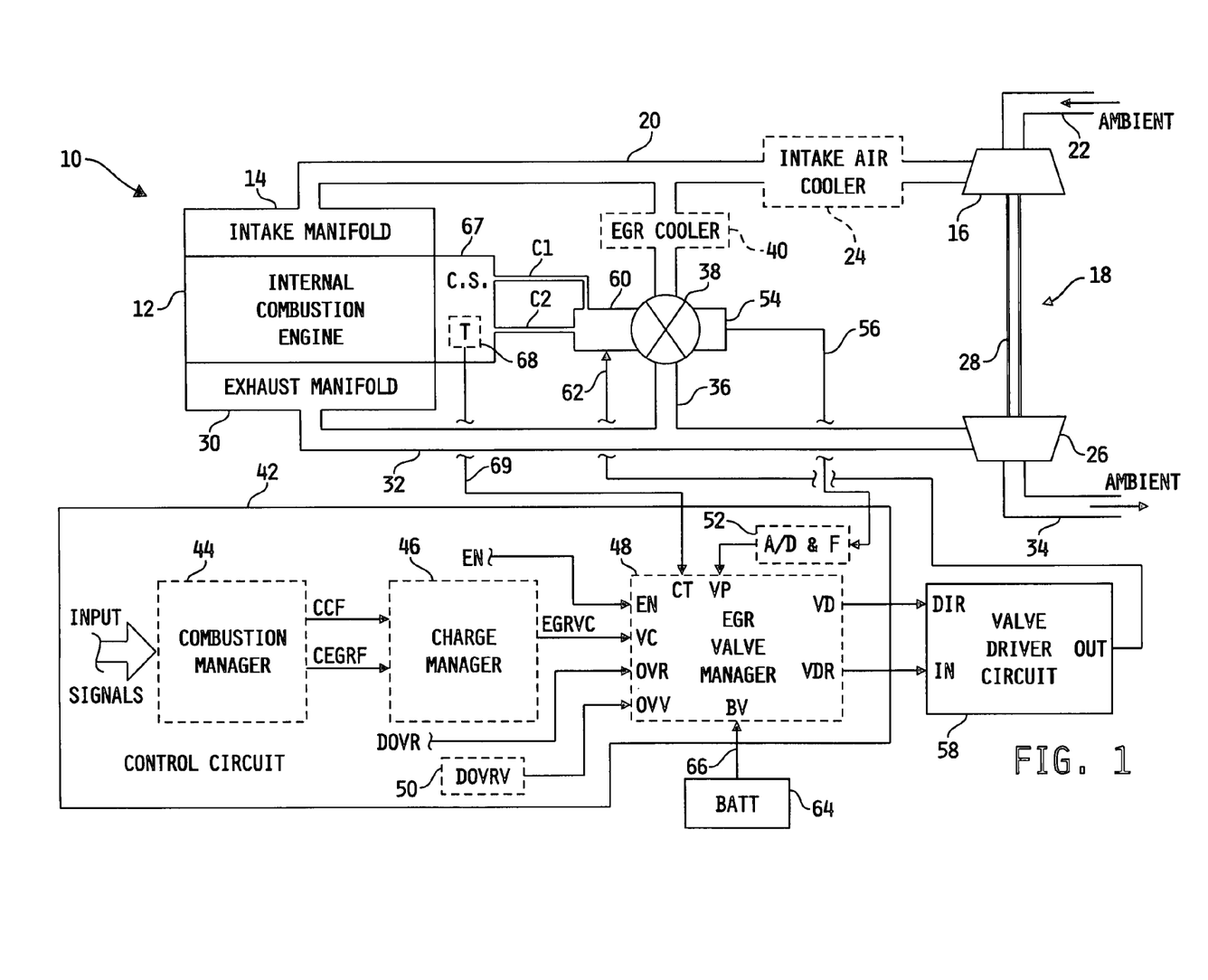
FIG. 1 is a diagram of one illustrative embodiment of an actuator control system shown in the context of an exhaust gas recirculation (EGR) valve control system.

Referring now to FIG. 1, a diagram of one illustrative embodiment of an actuator control system 10 is shown. The actuator control system embodiment shown in FIG. 1 is implemented in the context of an exhaust gas recirculation (EGR) valve control system, although it will be appreciated that this implementation represents only one illustrative actuator control system that is provided by way of example, and that the concepts illustrated and described herein are applicable to other actuators and actuator control systems. Any such other actuators or actuator control systems utilizing the concepts illustrated and described herein are intended to fall within the scope of the claims appended hereto.

System 10 includes an internal combustion engine 12 having an intake manifold 14 fluidly coupled to a compressor 16 of a turbocharger 18 via intake conduit 20, wherein the compressor 16 receives fresh air via fresh air conduit 22. Optionally, as shown in phantom in FIG. 1, system 10 may include an air intake cooler 24 of known construction disposed in line with intake conduit 20 between the turbocharger compressor 16 and the intake manifold 14. The turbocharger compressor 16 is mechanically coupled to a turbocharger turbine 26 via driveshaft 28, wherein turbine 26 is fluidly coupled to an exhaust manifold 30 of engine 12 via exhaust conduit 32, and is further fluidly coupled to ambient via exhaust conduit 34. The exhaust conduit 32 is also fluidly coupled to intake conduit 20 via an EGR conduit 36 having an EGR valve 38 of known construction disposed in line therewith. An EGR cooler 40 of known construction may optionally be disposed between EGR valve 38 and intake conduit 20 as shown in phantom in FIG. 1.

System 10 includes a control circuit 42 that is, in one embodiment, microprocessor-based and generally operable to control and manage the overall operation of engine 12. In this embodiment, control circuit 42 may be, for example, a known control unit sometimes referred to as an electronic or engine control module (ECM), electronic or engine control unit (ECU) or the like. Alternatively, control circuit 42 may be a general control circuit or application specific control circuit capable of operation as described hereinafter. In any case, control circuit 42 includes or has access to a memory unit (not shown), and has a number of inputs and outputs for interfacing with various sensors and systems coupled to engine 12.

In the embodiment illustrated in FIG. 1, control circuit 42 includes a combustion manager logic block 44 responsive to a number of input signals to produce a commanded charge flow value (CCF) and a commanded EGR fraction value (CEGRF). The combustion manager logic block 44 may typically be implemented as one or more control algorithms responsive to a number of engine operating conditions to produce the charge flow (CCF) and EGR fraction (CEGRF) commands, and an example of one such combustion manager embodiment particularly suited for use as combustion manager logic block 44 is described in co-pending U.S. patent application Ser. No. 10/059,619 entitled SYSTEM FOR PRODUCING CHARGE FLOW AND EGR FRACTION COMMANDS BASED ON ENGINE OPERATING CONDITIONS, which is assigned to the assignee of the present invention, and the disclosure of which is incorporated herein by reference. A charge manager logic block 46 is responsive to the commanded charge flow value, CCF, and the commanded EGR fraction value, CEGRF, produced by the combustion manager logic block 44 to produce an EGR valve command value, EGRVC for controlling operation and movement of the EGR valve 38. The charge manager logic block 46 may typically be implemented as one or more control algorithms responsive to the commanded charge flow and EGR fraction values, as well as a number of engine operating condition parameters, to produce the EGR valve command value, EGRVC, as a function thereof, and an example of one such charge manager that is particularly well suited for use as the charge manager logic block 46 is described in U.S. Pat. Nos. 6,480,782 and 6,408,834 to Brackney et al., both of which are assigned to the assignee of the subject disclosure, and the disclosures of which are each incorporated herein by reference.

Control circuit 42 further includes an EGR valve manager logic block 48 having a valve command input (VC) receiving the EGR valve command value, EGRVC, from the charge manager block 46, and an enable input, EN, receiving an enable value, EN, produced internal to control circuit 42. Likewise, control circuit 42 is operable to produce internally a diagnostic override command, DOVR, wherein this value is provided to an override input, OVR, of EGR valve manager block 48. Control circuit 42 further includes a diagnostic override value, DOVRV, stored within block 50, wherein the diagnostic override value is provided to an override value input, OVV, of EGR valve manager block 48. System 10 further includes an EGR valve position sensor 54 electrically connected to an analog-to-digital (A/D) converter and filter block 52 via signal path 56. Sensor 54 may be of known construction and is operable to produce a signal on signal path 56 indicative of the position of EGR valve 38 relative to a reference position. EGR valve manager block 48 includes an EGR valve position input, VP, receiving the converted and filtered EGR valve position signal from A/D and filter block 52.

System 10 further includes a vehicle battery 64 having a battery voltage line 66 electrically connected to a battery voltage input, BV, of the EGR valve manager 48, wherein manager block 48 is operable to monitor the voltage level of battery 64 via input BV thereof. Engine 12 includes a cooling system 67 having an engine coolant fluid circulating therethrough, wherein the cooling system is operable, in a manner well known in the art, to maintain the operating temperature of the engine within a specified temperature range. Cooling system 67 includes a temperature sensor 68 of known construction and in fluid communication with the coolant fluid, and sensor 68 is electrically connected to a coolant temperature input, CT, of the EGR valve manager block 48 via signal path 69. Sensor 68 is operable to provide a temperature signal on signal path 69 indicative of the temperature of the coolant fluid, and thus the operating temperature of the engine 12. The EGR valve manager block 48 is responsive to the various input signals thereto to produce a valve drive signal, VDR, and a valve direction signal, VD, at respective outputs thereof.

System 10 further includes a valve driver circuit 58 having a control signal input, IN, receiving the valve drive signal, VDR, from EGR valve manager block 48, and a direction input, DIR, receiving the valve direction signal, VD, from EGR valve manager block 48. An output, OUT, of valve driver circuit 58 is electrically connected to a valve actuator 60 associated with EGR valve 38 via signal path 62. In one embodiment, actuator 60 includes a known DC electric motor coupled to the EGR valve 38 via a known gear train arrangement, and the valve driver circuit 58 is an H-bridge or half H-bridge circuit producing a PWM signal having a duty cycle and direction that is controlled by a corresponding pulse-width modulated valve drive signal, VDR, and valve direction signal, VD, respectively produced by the EGR valve manager block 48. In this embodiment, the motor is responsive to the PWM signal produced by the driver circuit 58 to control the position and movement of the EGR valve 38, via the gear train arrangement, under the direction of the EGR valve manager block 48 by way of the valve driver circuit 58. Alternatively, the actuator may be an electric motor coupled directly to the valve 38, or may be any other known actuator drivable by the valve driver circuit 58 to control the movement and position of valve 38. In the illustrated embodiment, the actuator 60, and specifically the electric motor, is coupled to the cooling system 67 via fluid conduits C1 and C2 such that the coolant fluid in the cooling system 67 circulates through a fluid passageway (not shown) defined through the actuator 60 to maintain the operating temperature of the actuator 60 near that of the engine 12.

Figure 2:
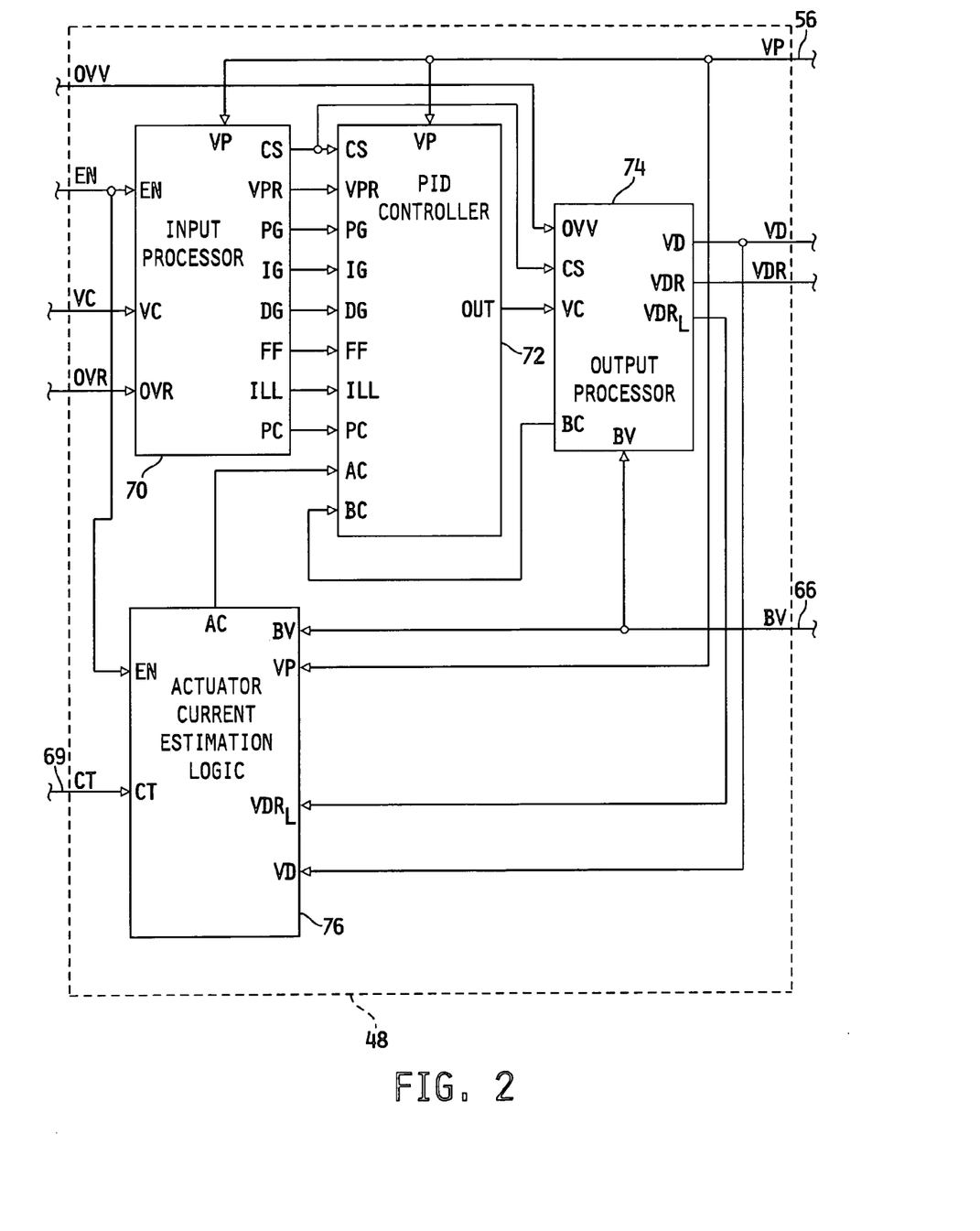
FIG. 2 is a diagram of one illustrative embodiment of the EGR valve manager block of FIG. 1.

Referring now to FIG. 2, one illustrative embodiment of the valve manager block 48 pf FIG. 1 is shown. Block 48 includes an input processor block 70 having an enable input, EN, defining the enable input of block 48, a valve command input, VO, defining the valve command input of block 48, an override input, OVR, defining the override input of block 48 and a valve position input, VP, receiving EGR valve position signal produced by sensor 54 and processed by the A/D and filter circuit 52. Input processor 70 includes a control state output, CS, providing a control state value to input CS of a PID controller 72. A valve position reference output, VPR, provides a valve position reference value to a VPR input of PID controller 72, and input processor block 70 provides a number of gain values to corresponding gain value inputs of PID controller 72. For example, processor block 70 provides proportional gain (PG), integral gain (IG) and derivative gain (DG) to corresponding inputs of PID controller 72. Additionally, input processor block 70 provides a feed-forward term, FF, to a corresponding input of PID controller 72 as well as an integrator lower limit term, ILL, to a corresponding input of controller 72. Input processor block 70 further provides a pre-filter constant value, PC, to a PC input of PID controller 72, and controller 72 further includes an EGR valve position input, VP, receiving the EGR valve position signal from A/D and filter circuit 52. The input processor is operable to process the EGR valve command value, EGRVC, which corresponds to a desired position of the actuator 60, and therefore a desired position of the EGR valve 38, and produce a corresponding reference position value at the valve position reference output, VPR. Further details relating to the structure and function of the input processor bock 70 are disclosed in U.S. Pat. No. 6,467,469 to Yang et al., which is assigned to the assignee of the subject disclosure, and the disclosure of which is incorporated herein by reference.

The PID controller 72 includes a valve position input, VP, receiving the EGR valve position signal produced by sensor 54 and processed by the A/D and filter circuit 52. Controller 72 further includes an actuator current input, AC, receiving an actuator current value from an actuator current output of an actuator current estimation logic block 78. The actuator current value produced by block 76 is an estimated value of the actuator current used by the actuator 60, and details relating to one embodiment of logic block 76 will be described hereinafter. Alternatively, system 10 may include a current sensor or probe, or other known current measuring mechanism, for measuring the actuator current used by actuator 60, in which case the actuator current logic block 60 may be omitted and a current value corresponding to the measured actuator current may be provided directly to the actuator current input, AC, of the PID controller 72. In any case, the PID controller 72 is operable, as will be described hereinafter, to process the described input signals and produce a corresponding PID output signal at output OUT, which is provided to a valve command input, VC, of an output processor block 74.

Output processor block 74 further includes a control state input, CS, receiving the control state value from input processor block 70, an override value input, OVV, defining the OVV input of the EGR valve manager block 48 and a battery voltage input, BV, monitoring the battery voltage produced by battery 64. Output processor block 74 is further operable to produce a battery compensation output, BC, which is fed back to a battery compensation input, BC, of PID controller 72. Additionally, output processor 74 is operable to produce the valve drive signal, VDR, a limited valve drive signal, $VDR_L$, and the valve direction signal, VD, produced by block 48. The output processor block 74 is operable to process the output signal produced by the PID controller 72, as well as the other illustrated input signals, to produce the valve drive signal, VDR, and valve direction signal, VD. Further details relating to the structure and operation of one embodiment of the output processor block 74 are provided in U.S. Pat. No. 6,467,469 which was previously incorporated herein by reference.

Actuator current estimation logic block 76 includes an enable input, EN, defining the enable input of block 48, a coolant temperature input, CT, receiving the coolant temperature signal on signal path 69, a battery voltage input, BV, receiving the battery voltage on signal path 66, a valve position input, VP, receiving the valve position signal on signal path 56, a limited valve drive input, $VDR_L$, receiving the limited valve drive signal produced by the output processor block 74, and a valve drive input, VD, receiving the valve drive signal produced by the output processor block 74. The actuator current estimation logic block 76 is operable to process the foregoing input signals and estimate a value of the actuator current therefrom as will be described in greater detail hereinafter.

Figure 3:
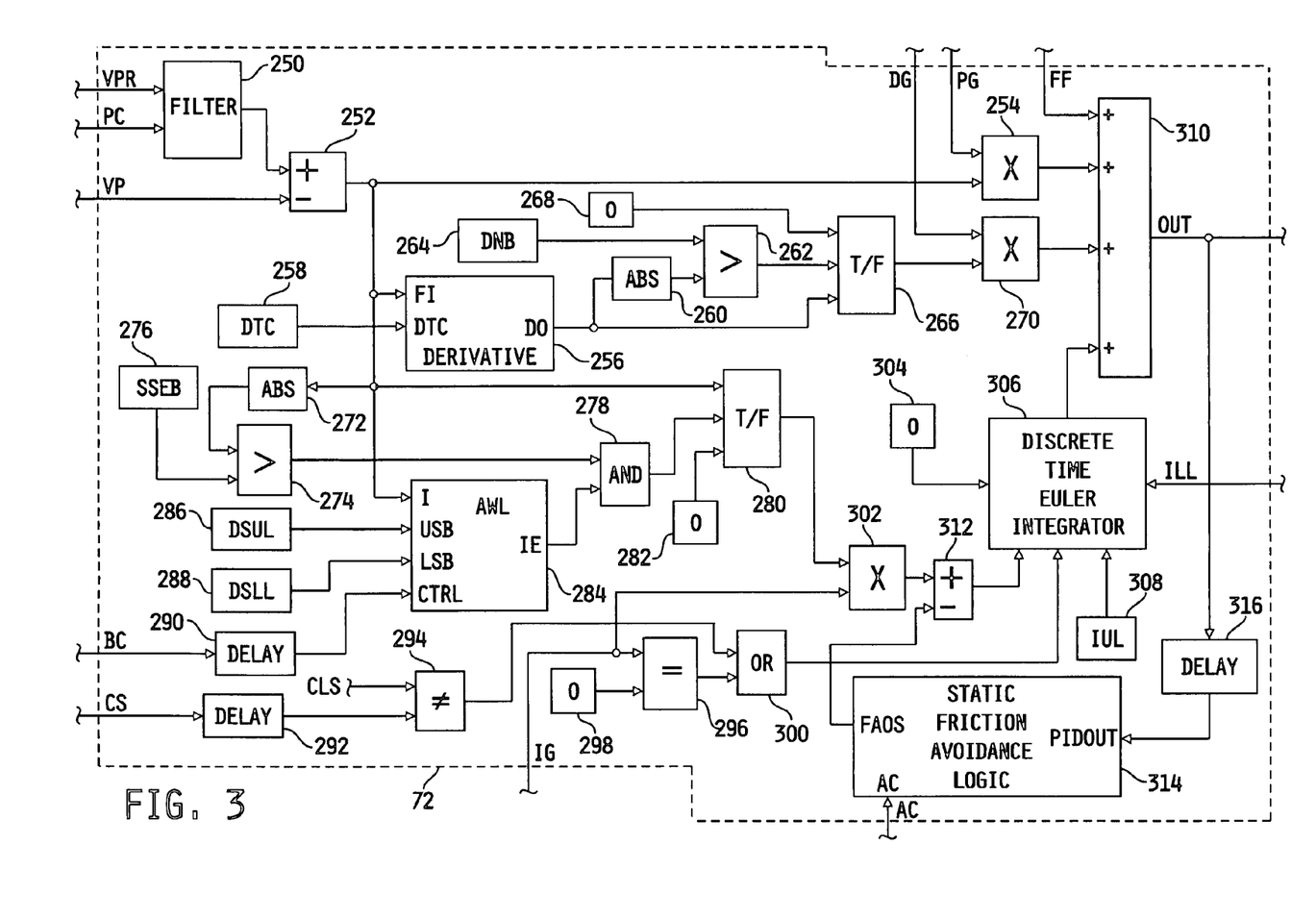
FIG. 3 is a diagram of one illustrative embodiment of the PID controller block forming part of the EGR valve manager block of FIG. 2.

Referring now to FIG. 3, one illustrative embodiment of the PID controller 72 of the EGR valve manager 48 is shown. Controller 72 includes a filter 250 having a first input receiving the valve position reference signal, VPR, produced by the input processor block 70 and a second input receiving the prefilter constant value, PC, produced by the input processor block 70. Filter 250, in one embodiment, is a core first order filter, although filter 250 may alternatively be configured according to other known filter structures. In any case, the output of filter 250 is provided to an addition input of a summation block 252 having a subtraction input receiving the valve position value, VP, produced by sensor 54. An output of summation block 252 is provided to one input of a multiplication block 254 having a second input receiving a proportional gain value, PG, produced by the input processor block 70. The output of summation block 252 is further provided to a filter input, FI, of a known derivative block 256 having a discrete filter time constant input, DTC, receiving a discrete time constant value, DTC, from block 258. A derivative output, DO, of derivative block 256 is provided as an input to an absolute value block, ABS, 260 having an output provided to a first input of a "greater than" arithmetic operator block 262 having a second input receiving a derivative noise band value, DNB, from block 264. An output of the arithmetic operator block 262 is provided as a control input to a true/false block 262 having a second input receiving the derivative output, DO, from derivative block 256 and a third input receiving a zero value from block 268. An output of true/false block 266 is provided as a first input to a multiplication block 270 having a second input receiving a derivative gain value, DG, produced by the input processor block 70.

The output of summation block 252 is further provided as an input to an absolute 20 value block 272 having an output provided to a first input of a "greater than" arithmetic operator block 274 having a second input receiving a steady state error band value, SSEB, from block 276. An output of arithmetic operator block 274 is provided as a first input to an AND block 278. An output of AND block 278 is provided as a control input to a true/false block 280 having a second input receiving the output of summation block 252, and a third input receiving a zero value from block 282.

An anti-windup logic block 284 includes an input, I, receiving the output of summation block 252, an upper saturation boundary input, USB, receiving a drive signal upper limit value, DSUL, from block 286, and a lower saturation boundary input, LSB, receiving a drive signal lower limit value, DSLL, from block 288. A delay block 290 has an input defining the battery compensation input, BC, of PID controller 72, and an output provided to a control input, CTRL, of the anti-windup logic block 284. An integration enable output, IE, of the anti-windup logic block 284 is provided to the second input of AND block 278. Details relating to the structure and operation of the anti-windup logic block 284 are provided in U.S. Pat. No. 6,467,469 which was previously incorporated herein by reference.

Another delay block 292 has an input defining the control state input, CS, of the PID controller 72 and an output provided as a first input to an inequality arithmetic operator block 294 having a second input receiving the closed loop state value, CLS, produced internal to the EGR valve manager block 48. An "equals" arithmetic operator block 296 has a first input defining an integral gain input, IG, produced by the input processor block 70, and a second input receiving a zero value from block 298. An output of block 296 is provided as a first input of a two-input OR block 300 having a second input receiving the output of arithmetic operator block 294. The output of OR block 300 is provided as a first input to a known discrete time Euler integrator block 306. The integral gain value, IG, is further provided as a first input to a multiplication block 302 having a second input receiving the output of true/false block 280.

An output of multiplication block 302 is provided as an addition input to an arithmetic block 312 having a subtraction input receiving a friction avoidance offset value, FAOS, from a friction avoidance offset output of a static friction avoidance logic block 314. Block 314 further includes an actuator current input, AC, receiving, in one embodiment, the estimated actuator current value from the actuator current estimation block 76. Alternatively, as described hereinabove, the actuator current input of block 314 may receive an actuator current value indicative of a measure actuator current value. In either case, block 314 further includes a PIDOUT input receiving via delay block 316 a delayed value of the output value produced by the PID controller 72 at output OUT. Details relating to one embodiment of the static friction avoidance logic block 314 will be described in greater detail hereinafter with respect to FIG. 4.

In any case, the output of arithmetic block 312 is provided as a second input to the discrete time Euler integrator block 306. A third input of integrator block 306 receives an upper integration limit, IUL, from block 308, and a fourth input defining the lower integration limit input, ILL, of the PID controller 72. A fifth input of integrator block 306 receives a zero value from block 304, and an output of integrator block 306 as provided to an addition input of a summation block 310. Second and third addition inputs of summation block 310 receive the outputs of multiplication blocks 254 and 270, respectively, and a fourth addition input of block 310 receives a feed-forward, FF, produced by the input processor block 70. The output of summation block 310 defines the output (OUT) of PID controller block 72.

In operation, the PID controller is configured to produce an actuator position error value at the output of arithmetic block 252, corresponding in the illustrated embodiment to a difference between the desired or reference valve position value, VPR, produced by the input processor block 70, and the actual or measured valve position value, VP, produced by sensor 54. The actuator position error value is multiplied by the proportional gain value, PG, to produce a proportional value that is proportional to the valve or actuator position error value. The actuator position error value is further provided to derivative block 256, which produces at output, DO, a derivative of the actuator position error value. The actuator position error derivative value is provided to one input of true/false block 266, which produces the actuator position error derivative value at its output as long as the absolute value of the actuator position error derivative value is less than or equal to the derivative noise band value, DNB. If so, the derivative of the actuator position error value is multiplied by the derivative gain value, DG, to produce a derivative value that is a function of the derivative of the actuator position error value. The actuator position error value is further provided one input of true/false block 280, which produces the actuator position error value at its output as long as the absolute value of the actuator position error value is greater than the steady state error band value, SSEB, and the output of the anti-windup logic block 284 is a high logic value. If so, the actuator position error value is multiplied by the integral gain value, IG, and the friction avoidance offset value, FAOS, is subtracted from this product, and this difference value is provided as an input to the integrator 306. The integrator 306 is operable, as is known in the art, to minimize the difference value. The output of the integrator 306 produces an integral value that is the integral of the difference between the actuator position error value and the friction avoidance offset value, FAOS. The proportional value, derivative value and integral value, as well as the feed forward value, are all summed by summation block 310 to produce the output of the PID controller 72. Further details relating to the structure and operation of the PID controller 72, without inclusion of blocks 312–316 are provided in U.S. Pat. No. 6,467,469 which was previously incorporated herein by reference.

Figure 4:
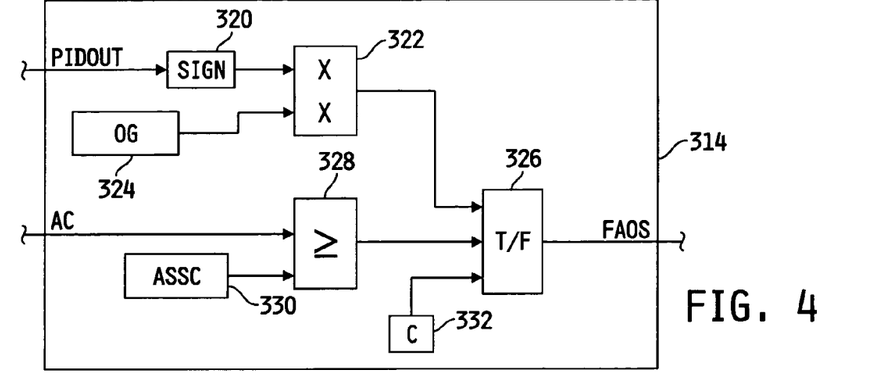
FIG. 4 is a diagram of one illustrative embodiment of the static friction avoidance logic block forming part of the PID controller block of FIG. 3.

Referring now to FIG. 4, one illustrative embodiment of the static friction avoidance logic block 314 of FIG. 3 is shown. Block 314 includes a sign block 320 having an input defining the PIDOUT input of block 314 and receiving the delayed output of the PID controller provided by delay block 316. Sign block 320 is operable to produce a "1" if the delayed output of the PID controller provided by delay block 316 is greater than zero, and is otherwise operable to produce a "−1". A first input of a multiplication block 322 receives the output of the sign block 320, and a second input of multiplication block 322 receives an offset gain value, OG, produced by gain block 324. In one embodiment, OG is a calibratible constant. Alternatively, OG may be a dynamic gain value that varies as a function of one or more operating conditions and/or parameters. For example, OG may be a function of the actuator position error value produced by the true/false block 280, a function of the scaled actuator position error value produced by multiplication block 302, or the like. In any case, the output of the multiplication block 322 is provided to a first input of a true/false block having a second input receiving a constant value, C, from block 332. In one embodiment, C is zero, although other values of C may alternatively be used. Alternatively still, C may be a dynamic function of one or more operating conditions and/or parameters. In any case, the control input of true/false block 326 receives the output of a "greater than or equal to" arithmetic block 328 having a first input receiving the actuator current value, AC, and a second input receiving a maximum actuator steady state current value, ASSC from block 330. As long as the actuator current, AC, is greater than or equal to the maximum actuator steady, the true/false block 326 produces as the friction avoidance offset value, FAOS a scaled offset value, corresponding to the offset gain value, OG, multiplied by the "1" or "−1" produced by the sign block 320. If, on the other hand, the actuator current, AC, is less than the maximum actuator steady state current value, ASSC, the true/false block 326 produces as the friction avoidance offset value, FAOS, the constant C (e.g., zero). In either case, the integrator 306 of the PID controller 72 is operable to minimize the difference between the scaled actuator position error value produced by multiplication block 312 and the friction avoidance offset value, FAOS, produced by block 314, as described hereinabove with respect to FIG. 3.

Figure 5:
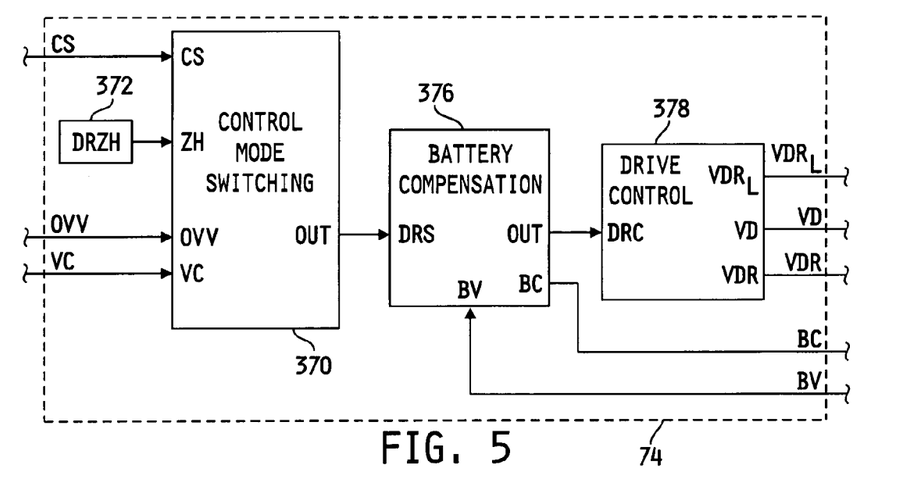
FIG. 5 is a diagram of one illustrative embodiment of the output processor block forming part of the EGR valve manager block of FIG. 2.

In embodiments including actuator current estimation logic block 76, as illustrated in FIG. 2, block 76 includes a limited valve drive input, VDRL, receiving a limited valve drive signal from the output processor block 74. Referring to FIG. 5, one illustrative embodiment of the output processor block 74 forming part of the EGR valve manager block 48 of FIG. 2 is shown. Block 74 includes a control mode switching block 370 having a control state input, CS, connected to the control state input, CS, of the output processor block 74, an override value input, OVV, connected to the override value, OVV, input of processor block 74 and a valve command input, VC, connected to the valve command input, VC, of the output processor block 74 and the output, OUT, of the PID controller 72. The control mode switching block 370 further includes a zero hold input, ZH, receiving a drive signal zero hold value, DRZH, from block 372, wherein DRZH is sized to cause the output processor block 74 to drive the EGR valve 38 sufficiently to maintain valve 38 in a closed position during valve closing events. An output, OUT, of control mode switching block 370 is provided to a drive signal input, DRS, of a battery compensation block 376 having a battery voltage input, BV, monitoring the voltage of battery 64. A battery compensation output, BC, of battery compensation block 376 defines the battery compensation output, BC, of the output processor 74, and a second output, OUT, of battery compensation block 376 is provided to a drive control input, DRC, of a drive control block 378. A valve drive output, VDR, of drive control block 378 defines the valve drive control signal output of output processor block 74 and of the EGR valve manager 48, a limited valve drive output, VDRL, defines the limited valve drive control output of block 74, and a valve direction output, VD, defines the valve direction output, VD, of the output processor block 74 and EGR valve manager 48. The valve drive output, VDR, is in one embodiment a PWM signal having a duty cycle defined by valve control manager 48, although other valve drive output configurations may alternatively be used. The output processor block 74 just described is configured to produce the valve drive, limited valve drive and valve direction control signals as a function of the PID output signal and of the remaining illustrated input signals. Further details relating to the structure and operation of the output processor block 74 illustrated in FIG. 5, with the exception of the limited valve drive signal, $VDR_L$, are provided in U.S. Pat. No. 6,467,469 which was previously incorporated herein by reference.

Figure 6:
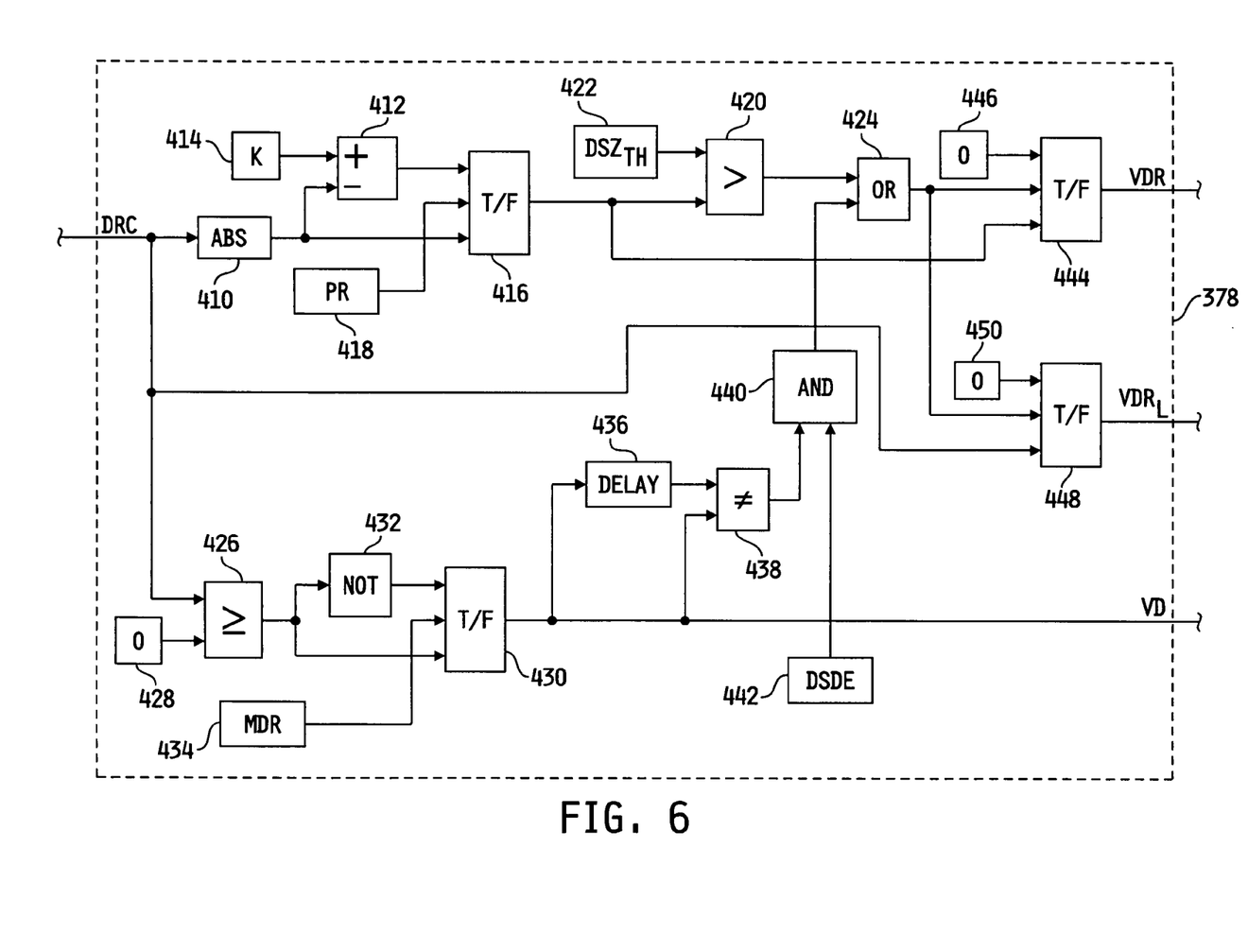
FIG. 6 is a diagram of one illustrative embodiment of the drive control logic block forming part of the output processor block of FIG. 5.

Referring now to FIG. 6, one illustrative embodiment of the drive control block 378 forming part of the output processor block 74 of FIG. 5 is shown. Block 378 includes an absolute value block 410 having an input connected to the drive control input, DRC, of block 378, and an output connected to a subtraction input of a summation block 412 having an addition block receiving a constant value K from block 414. An output of summation block 412 is provided as a first input to a true/false block 416 having a second input receiving the output of absolute value block 410, and having a control input receiving a polarity reversal value, PR, from block 418. An output of true/false block 416 is provided as a first input to a "greater than" arithmetic operator block 420 having a second input receiving a drive signal zero threshold value, $DSZ_{TH}$, from block 422. An output of arithmetic operator block 420 is provided as one input to a two-input OR block 424.

A "greater than or equal to" arithmetic operator block 426 has a first input connected to the drive command input, DRC, of block 378, and a second input receiving a zero value from block 428. An output of arithmetic operator block 426 is provided to an input of a NOT block 432 having an output connected to one input of a true/false block 430 having a second input connected to the output of arithmetic operator block 426. A control input of true/false block 430 receives a motor direction reversal value, MDR, from block 434. An output of true/false block 430 is provided as an input to a delay block 436 having an output connected to one input of an inequality arithmetic operator block 438 having a second input receiving the output of true/false block 430. The output of true/false block 430 also defines the valve direction output, VD, of drive control block 378, output processor block 74 and EGR valve manager 48.

The output of arithmetic operator block 438 is provided as one input of a two-input AND logic block 440 having a second input receiving a drive signal delay enable value, DSDE, from block 442. An output of AND block 440 is provided as a second input to OR block 424 having an output connected to the control input of a true/false block 444. A second input of true/false block 444 is connected to the output of true/false block 416, and a third input of true/false block 444 receives a zero value from block 446. An output of true/false block 444 defines the valve drive signal output, VDR, of the valve control block 378, output processor block 374 and EGR valve manager block 48. The output of OR block 424 is also provided as a control input to a true/false block 448 having one input receiving a zero value from block 450 and another output receiving the output signal produced by the PID controller 72. The output of true/false block 448 defines the limited valve drive signal, $VDR_L$. Generally, the drive control block 378 converts a signed duty cycle drive control value produced by the battery compensation block 376 PID to an absolute value, VDR, and an associated direction command, VD. The limited valve drive value, $VDR_L$, is equal to the signed duty cycle drive control value received at the drive control input, DRC, unless the output of the OR block 424 is high, in which case $VDR_L=0$.

Figure 7:
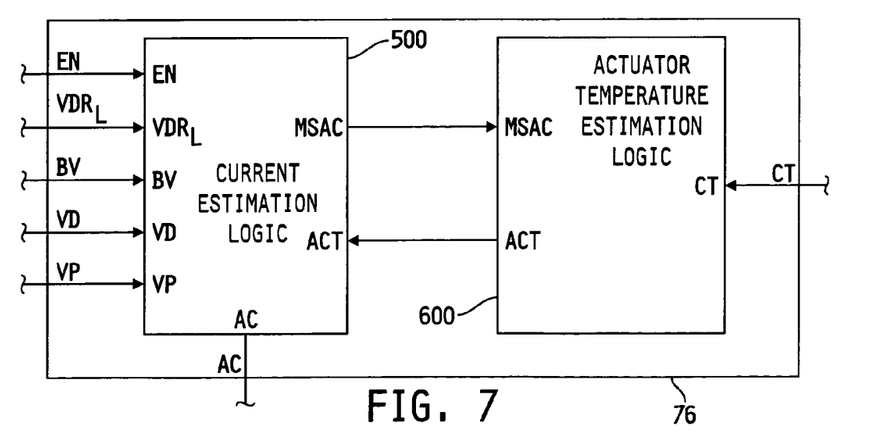
FIG. 7 is a diagram of one illustrative embodiment of the actuator current estimation logic block forming part of the EGR valve manager block of FIG. 2.

Referring now to FIG. 7, one illustrative embodiment of the actuator current estimation logic block 76 forming part of the EGR valve manager block 48 of FIG. 2 is shown. In the illustrated embodiment, the actuator current estimation logic block 76 includes a current estimation logic block 500 and an actuator temperature estimation logic block 600. The current estimation logic block 500 has an enable input, EN, receiving the enable signal, EN, produced internal to the control circuit 42 as illustrated in FIG. 1, a limited valve drive signal input, $VDR_L$, receiving the limited valve drive signal, $VDR_L$, produced by the drive control block 378 as illustrated in FIG. 6, a battery voltage input, BV, receiving the battery voltage on signal path 66, a valve direction input, VD, receiving the valve direction signal, VD, produced by the drive control block 378 as illustrated in FIG. 6, a valve position input, VP, receiving the conditioned valve position signal produced by the A/D and F block 52 of FIG. 1, and an actuator temperature input, ACT, receiving an estimated actuator temperature value from the temperature estimation logic block 600. Block 500 has an actuator current output, AC, producing an estimated actuator current value that is, in the illustrated embodiment, provided as an input to the static friction avoidance logic block 314 forming part of the PID controller 72 as illustrated in FIGS. 3 and 4, and a mean-squared actuator current output, MSAC, producing a mean-squared actuator current value that is provided as an input to the temperature estimation logic block 600. The current estimation logic block 500 is responsive to the various input signals and values to estimate an actuator current value, and to produce as outputs the estimated actuator current value, as well as a mean-squared actuator current value determined as a function of the estimated actuator current value, as will be described more fully hereinafter with respect to one illustrative embodiment of the current estimation logic block 500 shown in FIG. 8. Alternatively, system 10 illustrated in FIG. 1 may include a conventional current sensor or probe providing the EGR valve manager block 48 with a current signal indicative of the actuator current. In this alternate embodiment, block 600 may be omitted or may instead be included to provide redundant actuator current information for diagnostic or other purposes.

The temperature estimation logic block 600 has a mean-squared actuator current input, MSAC, receiving the mean-squared actuator current estimate produced by block 500, and a coolant temperature input, CT, receiving the coolant temperature signal on signal path 69. The temperature estimation logic block 600 is responsive to the mean-squared actuator current value and the coolant temperature value to estimate an actuator temperature value, and produce this actuator temperature value at an actuator temperature output, ACT, thereof as will be described more fully hereinafter with respect to one illustrative embodiment of the actuator temperature estimation logic block 600 shown in FIGS. 9–11.

Figure 8:
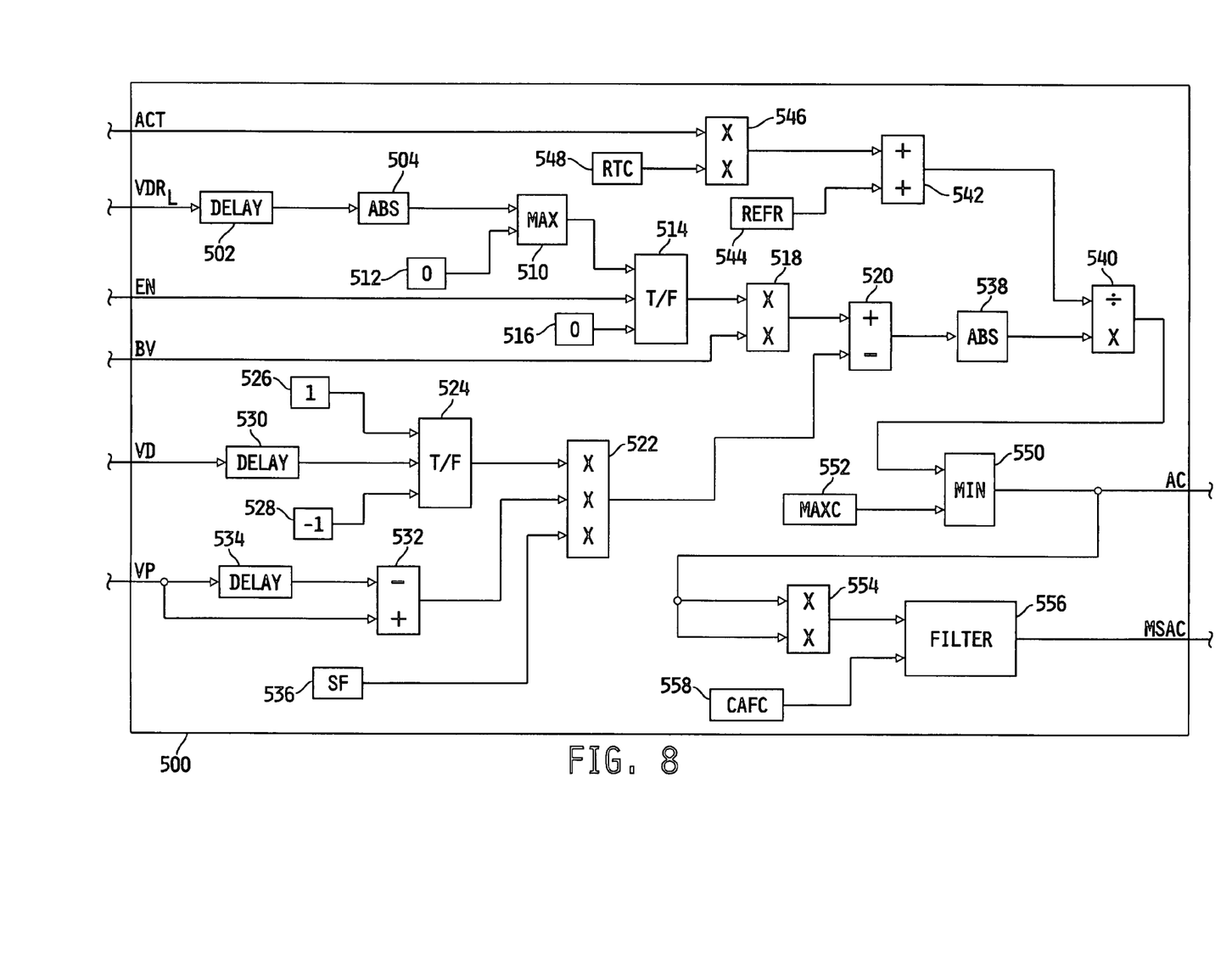
FIG. 8 is a diagram of one illustrative embodiment of the current estimation logic block forming part of the actuator estimation block of FIG. 7.

Referring now to FIG. 8, one illustrative embodiment of the current estimation logic block 500 forming part of the actuator current estimation logic block 76 of FIGS. 2 and 7 is shown. In the illustrated embodiment, the actuator current is estimated according to Ohm's law as the ratio of actuator voltage and effective actuator resistance, wherein the actuator voltage is the difference between applied average actuator voltage and back electromotive force (emf) produced by the actuator.

The limited valve drive value, $VDR_L$, is supplied to a delay block 502 and then to an absolute value block 504 such that a delayed absolute value of the limited valve drive value, $VDR_L$, is supplied to a first input of a MAX block 510 having a second input receiving a zero value from block 512. The output of the MAX block 510 is supplied as a first input to a true/false block 514 having a second input receiving a zero value from block 516. The enable signal, EN, supplies the control input to true/false block 514. An output of true/false block 514 is provided as a first input to a multiplication block 518 having a second input receiving the battery voltage on signal path 66. The output of the multiplication block 518 is provided to an addition input of an arithmetic block 520.

When valve control is enabled via enable signal, EN, the applied average actuator voltage produced by multiplication block 518 is a product of the battery voltage, BV, and duty cycle of the limited valve drive value, $VDR_L$. When valve control is not enabled, the applied average actuator voltage produced by multiplication block 518 is zero.

The valve direction value, VD, is supplied via a delay block 530 to a control input of a true false block 524 having a first input receiving a +1 value from block 526 and a second input receiving a –1 value from block 528. The output of true/false block 524 is supplied to a first input of a multiplication block 522 having a second input receiving the output of an arithmetic block 532 and a third input receiving a speed factor value, SF, from block 536. The speed factor value is a constant associated with the actuator 60 that correlates actuator speed to back emf, and will generally be dictated by the physical properties of the actuator 60. The arithmetic block 532 includes an addition input receiving the conditioned valve position signal provided by block 52, and a subtraction input receiving a delayed value of the conditioned valve position signal. The output of block 532 tracks the rate of change of EGR valve position, and is thus indicative of EGR valve travel speed. The product of the valve direction indicator produced by true/false block 524, the valve travel speed value produced by block 532 and speed factor conversion value produced by block 536 represents the back emf produced by actuator 60, and is provided as an output of multiplication block 522 to a subtraction input of arithmetic block 520. The output of arithmetic block 520 is passed through an absolute value block 538 and supplied to a multiplication input of arithmetic block 540. The value produced by block 538 is the absolute value of the actuator voltage, which is the difference between the applied average actuator voltage produced by block 518 and the back emf value supplied by block 522.

The actuator temperature value, ACT, is supplied to a first input of a multiplication block 546 having a second input receiving a resistance temperature coefficient value, RTC, from block 548. Generally, RTC represents a resistance coefficient, as a function of temperature, relating to the effective combined resistance of the actuator 60 and driver circuit 58. In embodiments wherein the actuator 60 includes an electric motor, RTC represents a motor winding resistance and driver circuit coefficient that defines motor winding and driver circuit resistance as a function of motor temperature. The value of RTC will generally be dictated by the physical properties of the motor. In any case, the output of multiplication block 546 supplies a temperature-based actuator resistance value, as a produce of the actuator temperature value, ACT, and the resistance coefficient, RTC, to a first input of a summation block 542. A second input of summation block 542 receives a reference resistance value, REFR, from block 544 wherein REFR represents a base-line (i.e., temperature independent) resistance value indicative of a base-line resistance of the combination the actuator 60 and drive circuit 58. The sum of these two resistance values represents an effective actuator/drive circuit resistance value, and is provided by an output of summation block 542 to a division input of arithmetic block 540. The output of block 540 is the ratio of the actuator voltage and effective actuator resistance, and therefore defines an estimate of the actuator current. This value is supplied to a first input of a MIN block having a second input receiving a maximum current value, MAXC, from block 552, wherein MAXC represents a practical upper limit on the actuator current value. The output of MIN block 550 defines the actuator current estimate value, AC, produced by the current estimation block 500 and the actuator current estimation block 76, and is also supplied to first and second inputs of a multiplication block 554. The output of multiplication block 554 is supplied to an averaging filter 556 having a filter current average filter constant, CAFC, supplied thereto by block 558. The output of filter 556 is a mean-squared representation of the estimated actuator current, AC, and therefore defines the mean squared actuator current value, MSAC, produced by block 500.

Figure 9:
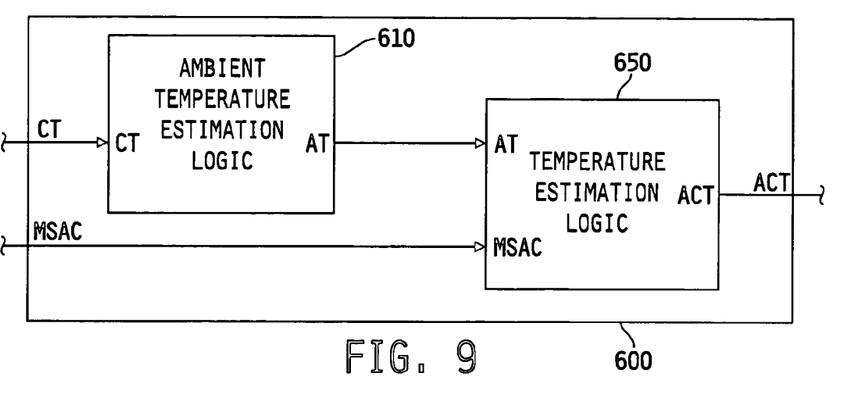
FIG. 9 is a diagram of one illustrative embodiment of the actuator temperature estimation logic block forming part of the actuator current estimation logic block of FIG. 7.

Referring now to FIG. 9, one illustrative embodiment of the actuator temperature estimation logic block 600 forming part of the actuator current estimation logic block 76 of FIGS. 2 and 7 is shown. In the illustrated embodiment, the actuator temperature estimation logic block 600 includes an ambient temperature estimation logic block 610 configured to estimate ambient temperature and a temperature estimation logic block 650 configured to estimate actuator operating temperature. The ambient temperature estimation logic block 610 has a coolant temperature input, CT, receiving the coolant temperature signal on signal path 69, and an ambient temperature output, AT, producing an estimated ambient temperature value. The ambient temperature estimation block 610 is operable to estimate ambient temperature as a function of coolant temperature as will be described more fully hereinafter with respect to one illustrative embodiment of the ambient temperature estimation block 610 shown in FIG. 10. Alternatively, system 10 illustrated in FIG. 1 may include a conventional ambient temperature sensor providing the EGR valve manager block 48 with a temperature signal indicative of the ambient temperature. In this alternate embodiment, block 610 may be omitted or may instead be included to provide redundant ambient temperature information for diagnostic or other purposes.

The temperature estimation logic block 650 has an ambient temperature input, AT, receiving the estimated ambient temperature value from the ambient temperature estimation logic block 610 (or alternatively from a conventional ambient temperature sensor provided with system 10), and a mean-squared actuator current input, MSAC, receiving the mean-squared actuator current estimate produced by the current estimation logic block 500 (or alternatively computed as a function of a current signal provided by a conventional actuator current sensor or probe provided with system 10). The temperature estimation logic block 650 is responsive to the mean-squared actuator current value and the ambient temperature value to estimate an actuator temperature value indicative of actuator operating temperature, and produce this actuator temperature value at an actuator temperature output, ACT, thereof as will be described more fully hereinafter with respect to one illustrative embodiment of the temperature estimation logic block 650 shown in FIG. 11. Alternatively, system 10 illustrated in FIG. 1 may include a conventional temperature sensor providing the EGR valve manager block 48 with a temperature signal indicative of the operating temperature of the actuator 60. In this alternate embodiment, block 650 may be omitted or may instead be included to provide redundant actuator operating temperature information for diagnostic or other purposes.

Figure 10:
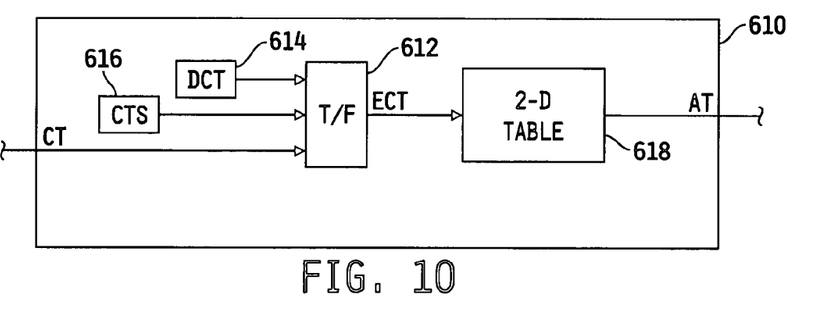
FIG. 10 is a diagram of one illustrative embodiment of the ambient temperature estimation logic block forming part of the actuator temperature estimation logic block of FIG. 9.

Referring now to FIG. 10, one illustrative embodiment of the ambient temperature estimation logic block 610 forming part of the temperature estimation logic block 600 of FIGS. 7 and 9 is shown. Block 610 includes a true-false block 612 having a "true" input receiving a default coolant temperature value, DCT, from data storage block 614, a control input receiving a coolant temperature source value, CTS, from data storage block 616 and a "false" input receiving the coolant temperature signal on signal path 69. If the coolant temperature source, CTS, has a high logic value, the true/false block 612 produces as its effective coolant temperature output value, ECT, the default coolant temperature value, DCT. If, on the other hand, CTS has a logic low value, the true/false logic block 612 produces as its effective coolant temperature output value, ECT, the measured coolant temperature value on signal path 69. CTS and DCT are both calibratible values, and may be modified in a convention manner; e.g., via a suitable service or recalibration tool. In one embodiment, CTS is set to a high logic value and DCT is set to a temperature value indicative of a fully warmed-up and running engine, although other default coolant temperature values may be used. Alternatively, CTS may be set to a low logic value such that ECT produced by block 612 is the measured coolant temperature value. In any case, the effective coolant temperature value, ECT, is provided as an input to a 2-dimensional table 618 mapping coolant temperature values to corresponding ambient temperature values according to a known relationship therebetween. The output of the table 618 is the ambient temperature value produced by the ambient temperature estimation logic block 610. Alternatively, block 618 may be implemented as a graph, plot, one or more equations or the like, producing ambient temperature values as a known function of coolant temperature. Alternatively still, system 10 may include an ambient temperature sensor operable to provide the EGR valve manager block 48 with an ambient temperature signal indicative of ambient temperature, as described hereinabove, in which case block 610 may be deleted or alternatively included to provide redundant ambient temperature information.

Figure 11:
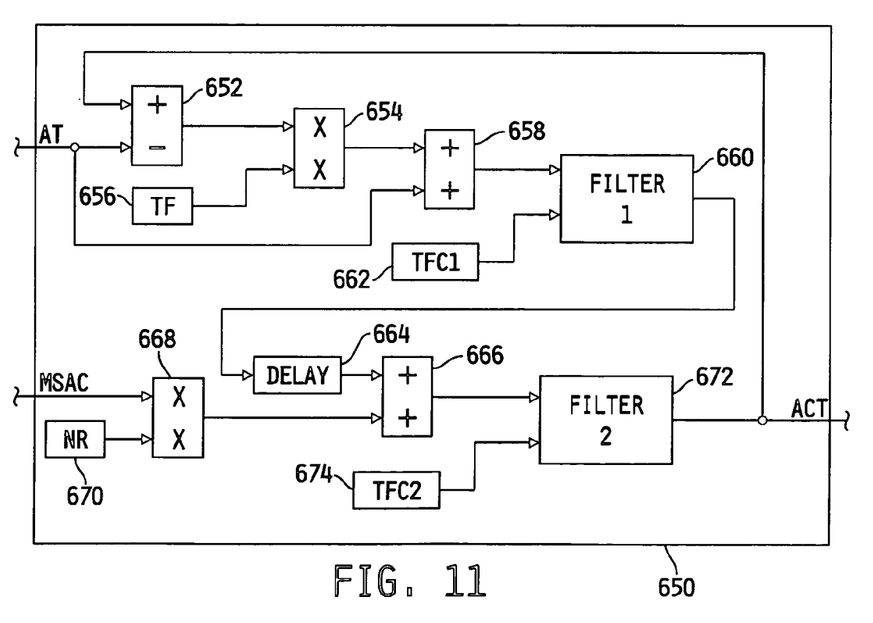
FIG. 11 is a diagram of one illustrative embodiment of the temperature estimation logic block forming part of the actuator current estimation logic block of FIG. 9.

Referring now to FIG. 11, one illustrative embodiment of the actuator temperature estimation block 650 forming part of the temperature estimation logic block 600 of FIG. 9 is shown. In the illustrated embodiment, the actuator temperature is estimated as a function of power generated from driving the actuator 60 and heat radiated from the actuator core to the remainder of the actuator 60 and actuator housing. An arithmetic block 652 has an addition input receiving the fed back actuator temperature estimation value, ACT, and a subtraction input receiving the ambient temperature value, AT. The difference between the estimated actuator current value, ACT, and the ambient temperature is supplied to a first input of a multiplication block 654 having a second input receiving a temperature factor, TF, from block 656. The temperature factor, TF, is a temperature value derived from the transfer of heat between the actuator core, remainder of the actuator 60 and actuator housing, and defines a multiplication factor for scaling the temperature difference between the actuator current estimate, ACT, and the ambient temperature, AT. The output of multiplication block 654 is supplied to a first input of a summation block 658 having a second input receiving the ambient temperature value, AT. The output of the summation block 658 is the sum of the ambient temperature, AT, and the scaled temperature difference between the estimated actuator temperature, ACT, and the ambient temperature, AT. This temperature sum is supplied to one input of a first filter 660 having another input receiving a first temperature filter constant, TFC1, from block 662.

The output of filter 660 is supplied to an input of a delay block 664 having an output supplying the delayed filter output to a first input of a summation block 666. A second input of summation block 666 receives the output of a multiplication block 668 having a first input receiving the mean squared actuator current value, MSAC, and a second input receiving a normalized resistance value, NR, from block 670. The normalized resistance value is derived from the heat resistance and electrical resistance associated with the actuator 60, and is determined generally based on the physical properties of the actuator 60. The product of the mean squared actuator current, MSAC, and the normalized resistance value, NR, is a power value representing heat generated by the actuator resulting from the actuator current, AC. This product, and the temperature value produced by the filter 660 are summed by summation block 666, and the output of block 666 is supplied to one input of a second filter 672 having another input receiving a second temperature filter constant, TFC2, from block 674. The output of filter 672 defines the estimated actuator current value, ACT, produced by block 650.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the controller block 72 is illustrated and described herein as a PID controller, it may alternatively be configured in accordance with other known controller configurations including at least an integrator. One example may include, but is not limited to, a known proportional-integral (PI) controller.

What is claimed is:

1. An actuator control system, comprising:
   an actuator responsive to an actuator control signal to control actuator position;
   means for determining actuator current used by the actuator; and
   a control circuit responsive to the actuator current exceeding a maximum actuator current value to modify the actuator control signal in a manner that limits the actuator current to a current value near a minimum current required to sustain the actuator position near a desired position.

2. The system of claim 1 wherein the control circuit includes:
   friction avoidance logic configured to produce an offset value, the offset value being a function of the actuator control signal if the actuator current exceeds the maximum actuator current value and otherwise being a constant offset value; and
   a controller responsive to a difference between an actuator position error value and the offset value to modify the actuator control signal such that the actuator current is limited to a current value near a minimum current required to sustain the actuator position near the desired actuator position by minimizing a difference between the actuator position error value and the offset value.

3. The system of claim 2 wherein the friction avoidance logic is configured to produce the offset value as an offset gain value if a delayed value of the actuator control signal is greater than zero and to otherwise produce the offset value as a negative of the offset gain value, if the actuator current exceeds the maximum actuator current value.

4. The system of claim 2 further including:
   an actuator position sensor producing a position signal indicative of the actuator position relative to a reference position; and
   actuator position error logic configured to produce the actuator position error value as a difference between a desired position of the actuator and the position signal.

5. The system of claim 4 wherein the controller includes:
   proportional logic producing a proportional value that is proportional to the actuator position error value;
   derivative logic producing a derivative value that is a derivative of the actuator position error value;
   integral logic producing an integral value that is an integral of the difference between the actuator position error value and the offset value, the integral logic including an integrator operable to minimize the difference between the actuator position error value and the offset value; and
   summation logic producing the actuator control signal as a sum of the proportional value, the derivative value and the integral value, the actuator control signal resulting in the actuator current being limited to the current value near the minimum current required to sustain the actuator position near the desired actuator position when the integrator minimizes the difference between the actuator position error value and the offset value.

6. The system of claim 1 further including an actuator position sensor producing a position signal indicative of the actuator position relative to a reference position;
wherein the means for determining actuator current comprises actuator current estimation logic configured to estimate the actuator current as a function of the actuator control signal, a supply voltage value, an actuator direction value indicative of actuator movement direction, the position signal and an actuator temperature value indicative of actuator operating temperature.

7. The system of claim 6 further including:
an engine cooling system coupled to the actuator such that the actuator operating temperature is near that of coolant fluid circulating through the engine cooling system; and
a temperature sensor producing a temperature signal indicative of coolant fluid temperature;
wherein the means for determining actuator current further comprises actuator temperature estimation logic configured to estimate the actuator temperature value as a function of the actuator current and the temperature signal.

8. The system of claim 1 wherein the actuator includes an electric motor coupled to a valve such that the electric motor controls a position of the valve relative to a reference valve position.

9. The system of claim 8 wherein the valve is disposed in-line with an exhaust gas recirculation conduit coupled between an intake manifold and an exhaust manifold of an internal combustion engine;
and wherein the control circuit is configured to adjust the position of the valve to control the flow of recirculated exhaust gas from the exhaust manifold to the intake manifold.

10. An actuator control system, comprising:
an actuator responsive to an actuator control signal to control actuator position;
a position sensor producing a position signal indicative of the actuator position;
means for determining actuator current used by the actuator;
means responsive to the actuator current exceeding a maximum actuator current value to produce an offset value as a function of the actuator control signal;
means for determining an error value as a difference between a desired actuator position and the position signal; and
means for modifying the actuator control signal to limit the actuator current to a current value near a minimum current required to sustain the actuator position near the desired actuator position by minimizing a difference between the error value and the offset value.

11. The system of claim 10 wherein the means responsive to the actuator current exceeding a maximum actuator current value to produce an offset value as a function of the actuator control signal includes means for producing the offset value as a function of the actuator control signal if the actuator current exceeds the maximum actuator current value and otherwise being a constant offset value.

12. The system of claim 11 wherein the means for producing the offset value as a function of the actuator control signal if the actuator current exceeds the maximum actuator current value includes means for producing the offset value as an offset gain value if a delayed value of the actuator control signal is greater than zero, and to otherwise produce the offset value as a negative of the offset gain value.

13. The system of claim 10 wherein the means for modifying the actuator control signal includes:
proportional logic producing a proportional value that is proportional to the actuator position error value;
derivative logic producing a derivative value that is a derivative of the actuator position error value;
integral logic producing an integral value that is an integral of the difference between the actuator position error value and the offset value, the integral logic including an integrator operable to minimize the difference between the actuator position error value and the offset value; and
summation logic producing the actuator control signal as a sum of the proportional value, the derivative value and the integral value, the actuator control signal resulting in the actuator current being limited to the current value near the minimum current required to sustain the actuator position near the desired actuator position when the integrator minimizes the difference between the actuator position error value and the offset value.

14. The system of claim 10 wherein the means for determining actuator current comprises actuator current estimation logic configured to estimate the actuator current as a function of the actuator control signal, a supply voltage value, an actuator direction value indicative of actuator movement direction, the position signal and an actuator temperature value indicative of actuator operating temperature.

15. The system of claim 14 further including:
an engine cooling system coupled to the actuator such that the actuator operating temperature is near that of coolant fluid circulating through the engine cooling system; and
a temperature sensor producing a temperature signal indicative of coolant fluid temperature;
wherein the means for determining actuator current further comprises actuator temperature estimation logic configured to estimate the actuator temperature value as a function of the actuator current and the temperature signal.

16. The system of claim 10 wherein the actuator includes an electric motor coupled to a valve such that the electric motor controls a position of the valve relative to a reference valve position.

17. The system of claim 16 wherein the valve is disposed in-line with an exhaust gas recirculation conduit coupled between an intake manifold and an exhaust manifold of an internal combustion engine;
and wherein the control circuit is configured to adjust the position of the valve to control the flow of recirculated exhaust gas from the exhaust manifold to the intake manifold.

18. A method of controlling an actuator configured to control actuator position, the method comprising:
determining actuator current used by the actuator; and
controlling the actuator current toward a minimum value of current required to sustain the actuator position near a desired actuator position.

19. The method of claim 18 wherein the actuator is responsive to an actuator control signal to control the actuator position;

and wherein the act of controlling the actuator current includes:

determining an error value as a difference between a desired actuator position and an actual actuator position;

determining an offset value as a function of the actuator control signal if the actuator current exceeds a maximum actuator current value; and modifying the actuator control signal to limit the actuator current to a current value near a minimum current required to sustain the actuator position near the desired actuator position by minimizing a difference between the error value and the offset value.

20. The method of claim 19 wherein the act of determining actuator current includes estimating the actuator current as a function of the actuator control signal, a supply voltage value, an actuator direction value indicative of actuator movement direction, the actual actuator position and an actuator temperature value indicative of actuator operating temperature.

* * * * *